United States Patent
Bello

(10) Patent No.: US 6,170,783 B1
(45) Date of Patent: *Jan. 9, 2001

(54) AERIAL CABLE RETAINER WITH RESILIENT PAD

(75) Inventor: Salvatore Bello, Nashua, NH (US)

(73) Assignee: Hendrix Wire & Cable, Inc., Milford, NH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/124,423

(22) Filed: Jul. 29, 1998

(51) Int. Cl.[7] ....................................... E21F 17/02
(52) U.S. Cl. ...................... 248/61; 24/132 WL; 174/146
(58) Field of Search ........................... 248/61, 74.1, 74.2, 248/316.5, 230.4; 24/136 R, 132 WL; 174/146

(56) References Cited

U.S. PATENT DOCUMENTS

| | | |
|---|---|---|
| 2,820,083 | 1/1958 | Hendrix . |
| 2,912,482 * | 11/1959 | Horrocks et al. ...................... 248/61 |
| 2,915,580 | 12/1959 | Gill et al. . |
| 2,927,147 * | 3/1960 | Flower ................................ 248/61 |
| 2,928,636 * | 3/1960 | Flower ................................ 248/61 |
| 2,934,587 | 4/1960 | Duffy et al. . |
| 3,005,609 | 10/1961 | Joffe . |
| 3,013,110 | 12/1961 | Kelm . |
| 3,021,382 | 2/1962 | Horrocks et al. . |
| 3,070,651 * | 12/1962 | Semple et al. ........................ 248/61 |
| 3,073,890 * | 1/1963 | Chewning et al. .................... 248/61 |
| 3,076,865 * | 2/1963 | Volk et al. ........................... 248/61 |
| 3,084,892 | 4/1963 | Priestley et al. . |
| 3,161,721 | 12/1964 | Torr . |
| 3,268,655 * | 8/1966 | Haigh et al. .......................... 248/61 |
| 3,300,576 * | 1/1967 | Hendrix et al. ....................... 248/61 |
| 3,456,066 * | 7/1969 | Petze, Jr. .............................. 248/61 |
| 3,465,089 | 9/1969 | Torr . |
| 3,716,650 | 2/1973 | de Mecquenem . |
| 3,743,762 | 7/1973 | Annas et al. . |
| 3,924,055 | 12/1975 | Moore et al. . |
| 3,939,300 | 2/1976 | Hawkins . |
| 3,940,553 | 2/1976 | Hawkins . |
| 3,963,855 | 6/1976 | Hawkins et al. . |
| 3,971,881 | 7/1976 | Hawkins . |
| 4,012,581 | 3/1977 | Hawkins . |
| 4,020,277 | 4/1977 | LaChance, Sr. et al. . |
| 4,082,917 * | 4/1978 | Hendrix ............................... 248/61 |
| 4,178,467 | 12/1979 | Hawkins . |
| 4,188,502 | 2/1980 | Gagne . |
| 4,360,177 | 11/1982 | Dulhunty . |
| 4,480,149 | 10/1984 | Hawkins et al. . |
| 4,579,306 | 4/1986 | Kellett et al. . |
| 4,638,469 | 1/1987 | Bryant et al. . |
| 4,723,053 | 2/1988 | Amaya . |
| 5,021,612 * | 6/1991 | Joffe ..................................... 248/61 |
| 5,371,320 | 12/1994 | Torok et al. . |

* cited by examiner

Primary Examiner—Anita M. King
(74) Attorney, Agent, or Firm—Piper Marbury Rudnick & Wolfe

(57) ABSTRACT

An aerial cable spacer is provided with a cable retainer. The cable retainer includes a cable seat and a cable retaining arm. A resilient pad is secured to either or both of the cable seat and the cable retaining arm. With a cable located in the cable seat and the cable retaining arm closed upon the cable, the resilient pad is compressed and acts like a spring to maintain a force on the cable.

30 Claims, 4 Drawing Sheets

AERIAL CABLE RETAINER WITH RESILIENT PAD

FIELD OF THE INVENTION

The invention relates to spacers for aerial cables for supporting one or more cables above the ground, and more particularly to a cable retainer for aerial cable spacers, the cable retainer having an improved clamping capability.

BACKGROUND OF THE INVENTION

Overhead conductor cables are commonly suspended from a messenger cable typically made of high strength alloys. The messenger cable is supported on poles or towers with the conductor cable spacers arranged at spaced intervals along the messenger cable to suspend one or more conductor cables. Since many power circuits require three phase electric power, it is often convenient to suspend conductor cables in groups of three. A spacer supports all three conductor cables and simultaneously maintains the conductors in spaced relation.

If the advantages of suspending conductors in this manner are to be fully availed, it is essential that the spacer be easily attached to the messenger cable and to the conductor cables. To provide ease of attaching the spacer to the cables and to reduce the number of parts required, the means for retaining the cables in their respective seats of the spacer should accommodate cables of varying cross sectional diameters without requiring bushings, sleeves, grommets or the like.

The construction of the spacer should be such that all of its parts have both high mechanical and electrical strength and are durable in use. In addition, all parts of the spacer should be economical to manufacture and to assemble.

U.S. Pat. No. 4,020,277 issued Apr. 26, 1977 to Hendrix Wire & Cable Corporation, the predecessor to the instant assignee, and discloses a spacer for aerial cables. The spacer includes a body member having at least one generally arcuate cable retaining means adapted to engage a surface of the conductor cable and retain the cable in a concave seat of the spacer. One end of the cable retaining means is pivotally supported on the body member. Generally arcuate ratchet tooth means are provided adjacent the other end of the cable retaining means. Generally arcuate ratchet tooth means are also provided on the body member outwardly of the concave seat. The teeth of the retainer ratchet tooth means are engagable with the teeth of the body member ratchet tooth means when the retaining means is rotated about its pivotal support, thereby to firmly retain the conductor cable in the concave seat.

Hawkins U.S. Pat. No. 4,480,149 discloses a spacer for overheard electric lines. The cable is gripped between an inside elastomer bushing and an outside elastomer bushing. The bushing halves are compressed and held together about the conductor by a U-shaped resilient clip, which has snaps which are fitted into grooves disposed on the spacer.

However, it has been found in the prior art spacers that the force exerted on the cable is not satisfactory. Alternatively, it has been found that it is difficult to close the cable retainer with sufficient force exerted on the cable.

SUMMARY OF THE INVENTION

It is an object of the present invention to provide an aerial cable spacer which overcomes the above noted problems of the prior art.

It is a further object of the present invention is to provide an aerial cable spacer which exerts a high force on the cable.

It is still a further object of the present invention to provide an aerial cable spacer having a cable retainer which closes easily with a force exerted on the cable and which accommodates cables of a wide range of sizes.

It is yet a further object of the present invention to provide an aerial cable spacer having a cable retainer which closes easily with a force exerted on the cable and which can be used repeatedly without losing its effectiveness to retain the cable.

Yet a further object of the present invention is to provide an aerial cable spacer having a cable retainer which closes easily with a force exerted on the cable and which is cost effective to manufacture.

Still a further object of the present invention is to provide an aerial cable spacer having a cable retainer which closes easily with a force exerted on the cable and which is durable.

Yet still another object of the invention is to provide a cable spacer made of the same material as the cable, thereby making them dielectrically compatible.

The present invention therefore provides a device for supporting and spacing aerial cables, the device comprising a main body portion, the main body portion having a cable seat, the cable seat having a cable engaging surface, a first side adjacent the cable seat, and a second side adjacent the cable seat and opposite from the first side; a cable retaining arm having a cable engaging surface, a first end pivotally coupled to the second side of the main body portion, and a second end, the second end having a means for releasably engaging the first side of the main portion; and a resilient member secured to one of the cable engaging surfaces, whereby the cable retaining arm is capable of closing upon a cable positioned in the cable seat and comprising the resilient member which acts like a spring to maintain a force on the cable.

DETAILED DESCRIPTION OF THE PREFERRED EMBODIMENT

Figure 1:
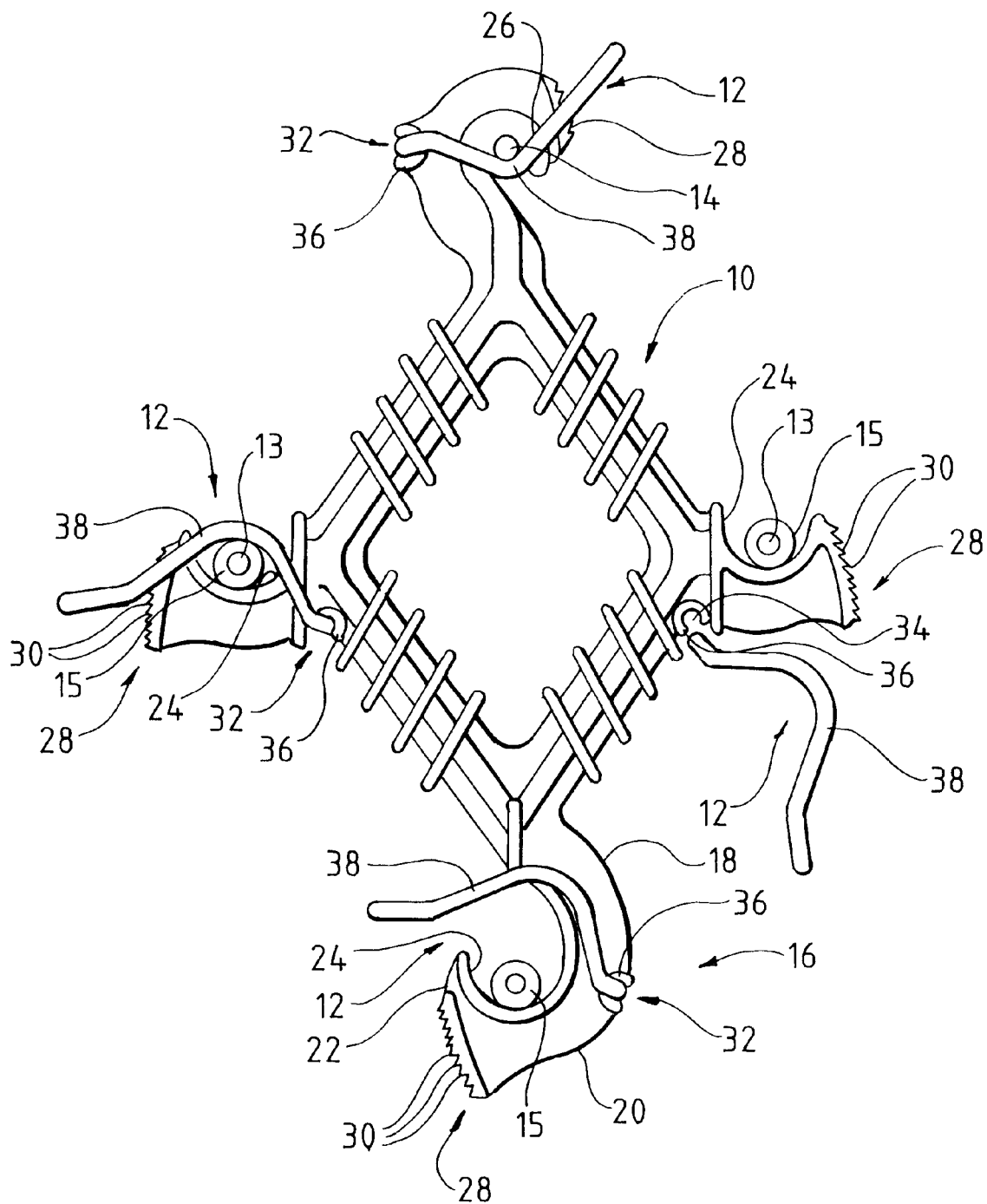
FIG. 1 is an elevational view of a prior art aerial cable spacer, having a plurality of cable retainers.

The prior art spacer shown in FIG. 1 includes the body member 10 and four generally arcuate cable retaining means 12. The spacer secures three conductor cables 13 and is suspended by a messenger cable 14. The conductor cable 13 includes insulating sheaths 15.

Both the body member 10 and the retaining means 12 are made from a thermoplastic material, the preferred embodiment being a polymer which has a low dielectric constant and has both weather and track resistant qualities.

The body member 10 is provided with four hook portions 16 each having a neck portion 18, head portion 20 and end portion 22. The body member 10 is further provided with three generally concave conductor cable seats 24 and a generally concave messenger cable seat 26.

The body member 10 is provided with four generally arcuate ratchet tooth means 28. Each ratchet tooth means 28 is located adjacent to the sides of the respective seat 24 and 26. Each ratchet tooth means 28 includes a plurality of teeth 30.

The body also comprises semi-cylindrical sockets 32. The sockets 32 are located adjacent to the sides of the respective seat 24 and 26. The sockets 32 are located opposite from the respective body ratchet tooth means 28. The sockets 32 are provided with slots 34 which are formed in part by the flanges 36 which form reinforcements for the sockets 32.

Figure 2:
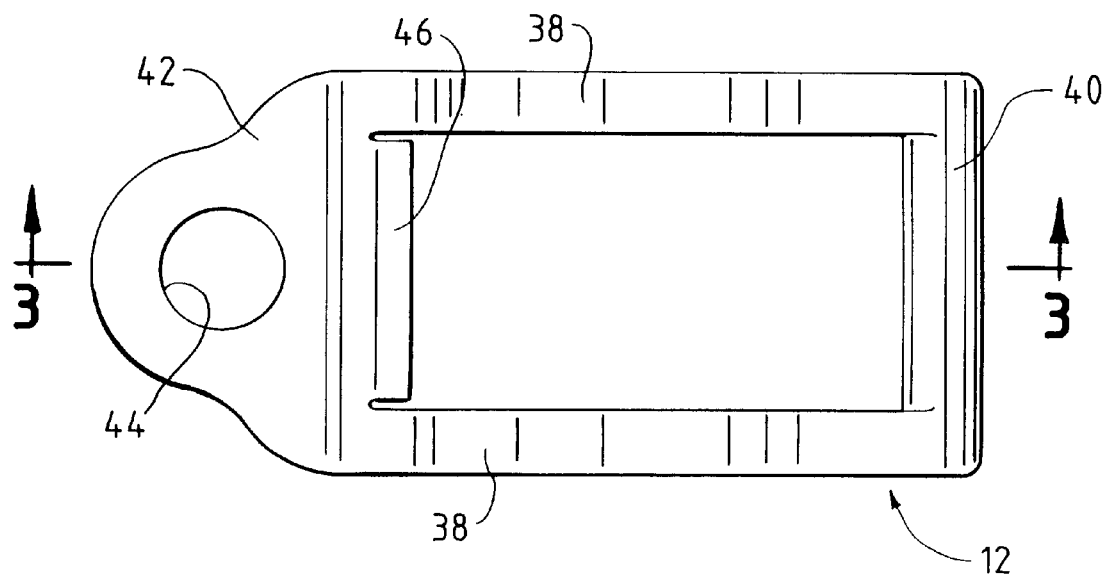
FIG. 2 is a plan view of one of the prior art cable retainers of FIG. 1.
Figure 3:
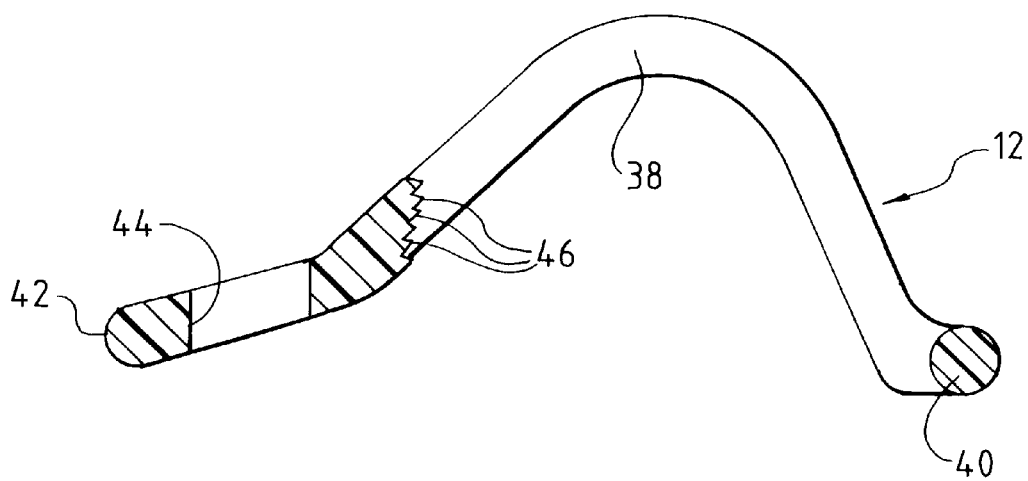
FIG. 3 is a cross-sectional view of the prior art cable retainer taken along line 3—3 of FIG. 2.

Each cable retaining means 12 comprises a pair of parallel spaced generally arcuate arms 38 (FIGS. 2 and 3), connected together at one end by a generally cylindrical member 40 and at the other end by a transverse member 42. The transverse member 42 is provided with a hole or perforation 44. The transverse members 42 of the retaining means 12 are also provided with generally ratchet tooth means 46.

Figure 4:
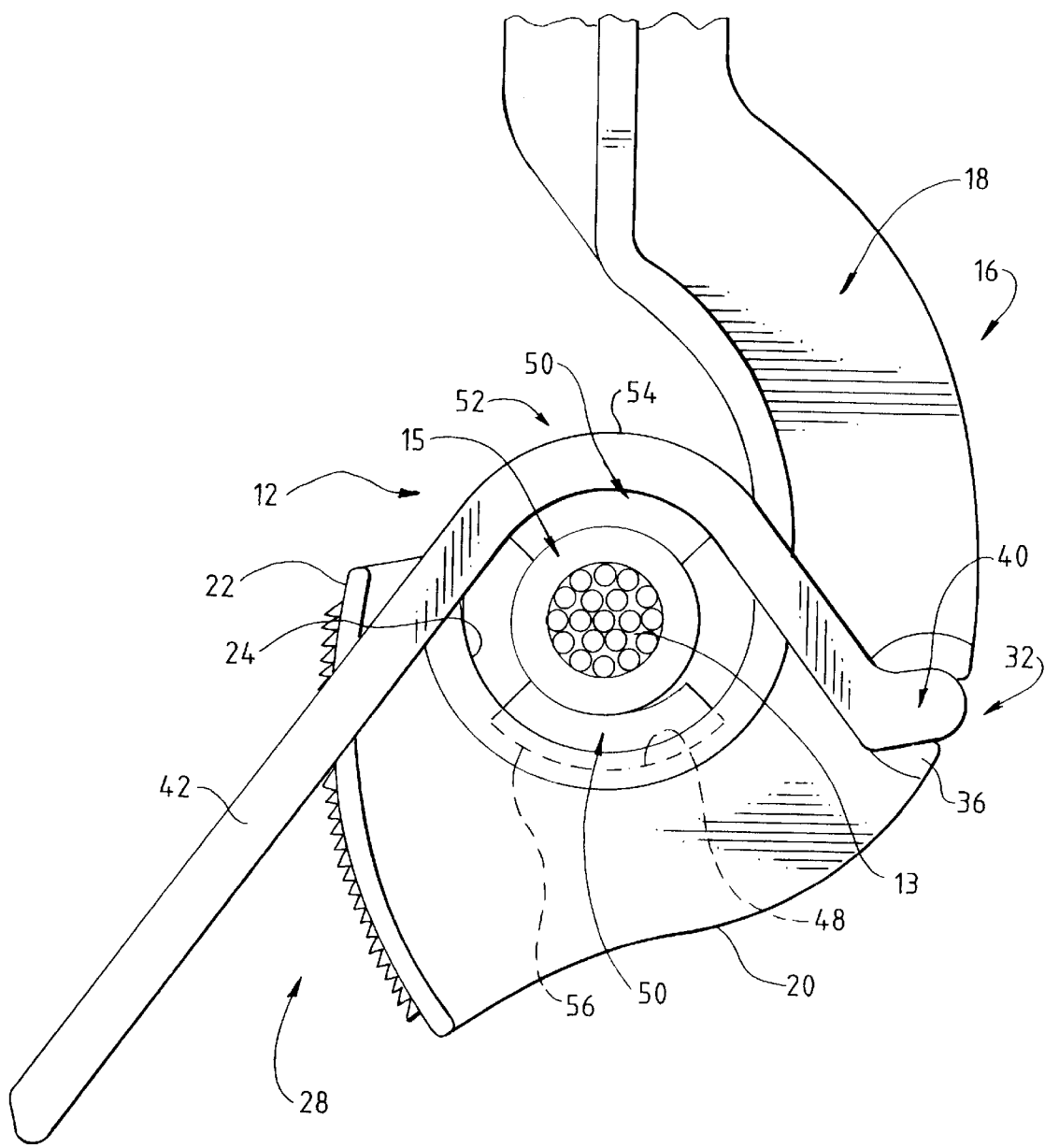
FIG. 4 is an elevational view of a cable retainer in accordance with the present invention.
Figure 5:
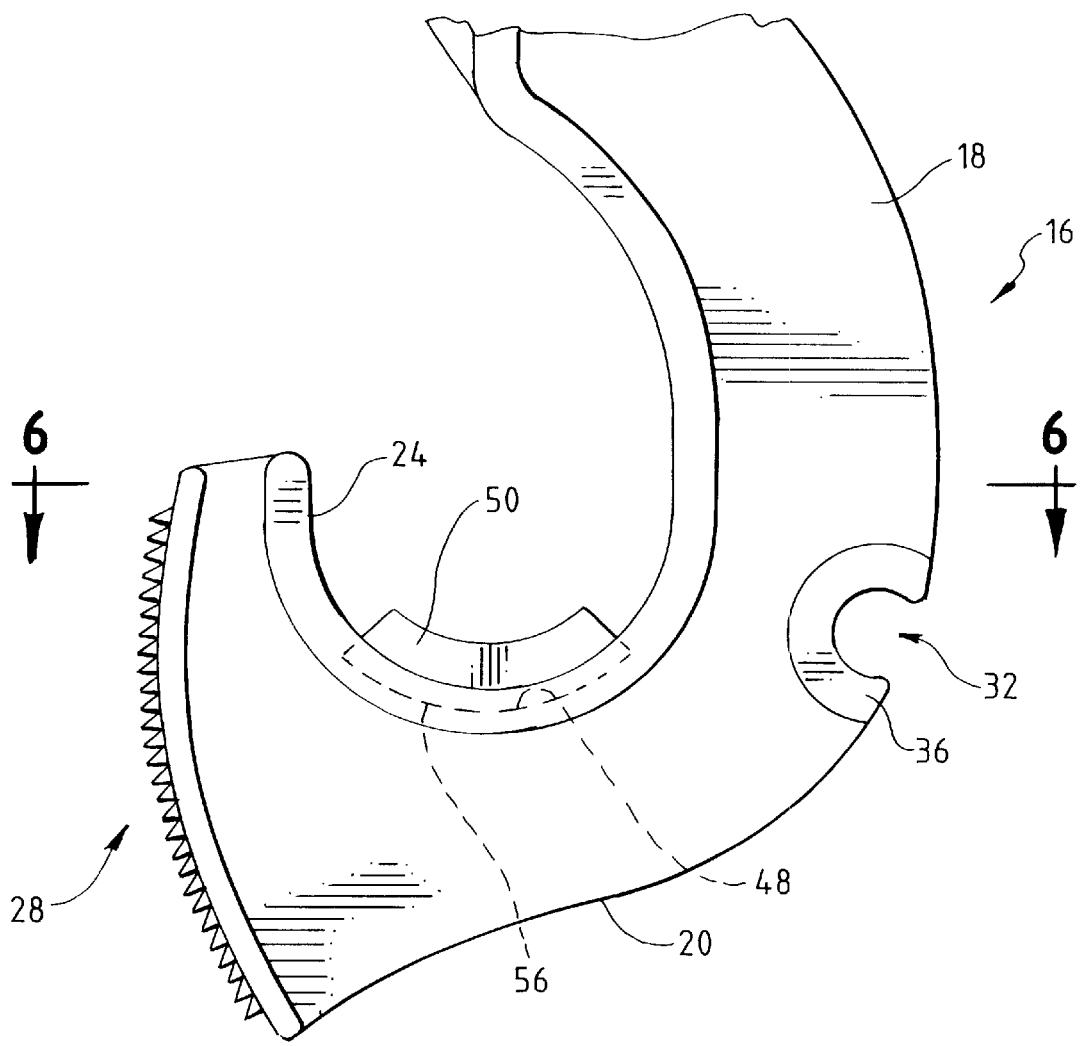
FIG. 5 is an elevational view of the cable retainer of FIG. 4 without the cable retaining arm.
Figure 6:
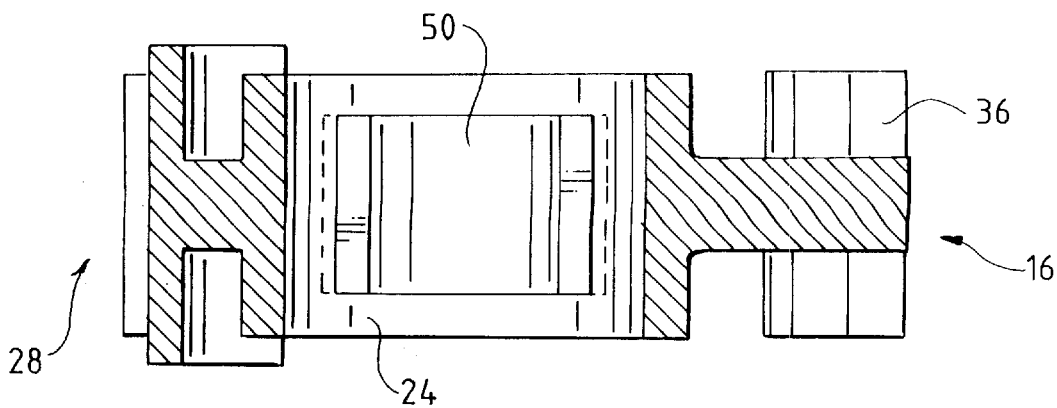
FIG. 6 is a cross sectional view taken along line 6—6 of FIG. 5.

FIG. 4 discloses the cable spacer in accordance with the present invention. Hook portion 16 is shown with the cable retaining means 12. A cable 13 with insulating sheath 15 is secured in the cable seat 24. The cable seat 24 includes a recess 48. A resilient pad 50 is secured in the recess 48 using an adhesive or similar means of securing the resilient pad. The arcuate arms 38 each include a mid-portion 52 having an elbow-shaped portion 54. Additional resilient pads 50 are also secured to the elbow-shaped portion 54 of each of the arcuate arms 38. The additional resilient pads 50 are secured to the arcuate arms 38 using an adhesive or similar means of securing the additional adhesive pads. The resilient pads 50 may include one side with a self securing adhesive material 56.

In an alternative embodiment, the present invention may consist of only one resilient pad 50 secured to the cable seat or one or more resilient pads 50 secured to the cable retaining means 12.

To assemble the parts of the spacer, it is only necessary to snap each of the generally cylindrical members 40 through the slots 34 and into the respective socket 32.

To install the spacer, the cable retaining means 12 are rotated to open positions in which they are temporarily retained because of the snug fit between the generally cylindrical members 40 and the respective socket 32. The messenger cable seat 26 is then placed over the messenger cable 14 and the cable retaining means 12 adjacent to it is partially closed to hold the messenger cable 14 in its seat 26. Then the conductor cables 13 are positioned in the seats 24. The cable retaining means 12 are each rotated to closed positions so that the ratchet tooth means 46 engages the respective body member ratchet tooth means 28, and the resilient pads 50 firmly contact the insulating sheaths 15 of the conductor cables 13. Further movement of the complete retaining means 12 will be restricted due to the engagement of the resilient pads 50 with the conductor cable 13. However, the resilient nature of the resilient pads 50 will allow a certain degree of compression. As a result, the retaining means 12 may be easily moved further in the closing direction with the engaging ratchet tooth means 46 and the body ratchet tooth means 28 locking the retaining means 12 in position with respect to the body member 10.

The further movement of the retaining means 12 beyond the initial contact of the resilient pad 50 with the cables 13, 14 introduces a spring force in the resilient pad 50 which causes the resilient pad 50 to exert a respectively greater force on the cables 13, 14. Thus the conductor cables 13 are firmly held in their respective seats 24. The retaining means 12 for the messenger cable 14 is similarly rotated to a fully closed position so that the resilient pad 50 firmly contacts the messenger cable 14 thereby to firmly hold it in its seat 26.

The holes or perforations 44 may be used to close and open the retaining means 12 by inserting a screwdriver or other elongate tool and, using the tool as a lever, either to tighten the retaining means 12 with respect to the cable 13, 14 or to pry it open so that it may be rotated to an open position in the event is becomes necessary to repair or replace the cables 13, 14.

It will be apparent to persons skilled in the art that a spacer embodying this invention is new, economical to manufacture and assemble and durable in use. The spacer can accommodate a wide range of cable sizes. Furthermore, it consists of only three parts, the body 10, resilient pad 50 and four cable retaining means 12. The body 10 and the retaining means 12 are made of the same thermoplastic material at the same time using a single mold cut and are weather and track resistant. In addition, the cable retaining means 12 is easily closed while also providing a sufficient force on the cable 13, 14.

While a preferred embodiment of a spacer for aerial cables embodying the invention has been shown in the drawings, it is to be understood that this disclosure is for the purpose of illustration only, and that various changes in shape, proportion and arrangement of parts as well as the substitution of equivalent elements for those shown and described herein may be made without departing from the spirit and scope of the invention as set forth in the appended claims.

What is claimed:

1. A device for supporting and spacing aerial cables, the device comprising:
   a main body portion, the main body portion having,
     a cable seat, the cable seat having a cable engaging surface,
     a first side adjacent the cable seat, and
     a second side adjacent the cable seat and opposite from the first side;
   a cable retaining arm having,
     a cable engaging surface,
     a first end pivotally coupled to the second side of the main body portion, and
     a second end, the second end having a means for releasably engaging the first side of the main body portion; and
   a resilient member secured to one of the cable engaging surfaces, whereby the cable retaining arm is capable of closing upon a cable positioned in the cable seat and comprising the resilient member which acts like a spring to maintain a force on the cable.

2. The device of claim 1, wherein the resilient member is secured to the cable engaging surface of the cable seat.

3. The device of claim 2, wherein the cable engaging surface of the cable seat includes a recess and the resilient member is located in the recess.

4. The device of claim 2, wherein the resilient member is a resilient pad.

5. The device of claim 2, wherein the first side of the main body portion includes a plurality of teeth and the releasably engaging means includes a portion capable of releasably engaging the plurality of teeth, whereby the cable retaining arm is releasably locked in a position to retain the cable in the seat.

6. The device of claim 1, wherein the resilient member is secured to the cable engaging surface of the cable retaining arm.

7. The device of claim 6, wherein the cable retaining arm includes a mid-portion, the mid-portion having an elbow portion, the elbow portion having the cable engaging surface, the resilient member being secured to the cable engaging surface of the elbow portion.

8. The device of claim 6, wherein the resilient member is a resilient pad.

9. The device of claim 6, wherein the first side of the main body portion includes a plurality of teeth and the releasably engaging means includes a portion capable of releasably engaging the plurality of teeth, whereby the cable retaining arm is releasably locked in a position to retain the cable in the seat.

10. The device of claim 6, wherein another resilient member is secured to the cable engaging surface of the cable seat.

11. A device for supporting and spacing aerial cables, the device comprising:
    at least one cable retainer, said cable retainer having;
        a cable seat, the cable seat having a cable engaging surface,
        a first side adjacent the cable seat,
        a second side adjacent the cable seat and opposite from the first side,
        a cable retaining arm having,
            a cable engaging surface,
            a first end pivotally coupled to the second side, and
            a second end, the second end having a means for releasably engaging the first side of the cable retainer, and
            a resilient member secured to one of the cable engaging surfaces, whereby the cable retaining arm is capable of closing upon a cable positioned in the cable seat and compressing the resilient member which acts like a spring to maintain a force on the cable.

12. The device of claim 11 wherein the resilient member is secured to the cable engaging surface of the cable seat.

13. The device of claim 12, wherein the cable engaging surface of the cable seat includes a recess and the resilient member is located in the recess.

14. The device of claim 11, wherein the resilient member is secured to the cable engaging surface of the cable retaining arm.

15. The device of claim 12, wherein another resilient member is secured to the cable engaging surface of the cable seat.

16. An aerial cable spacer comprising:
    a main body portion having a messenger cable retainer and at least one conductor cable retainer, each of the messenger and cable retainers having,
        a hook portion extending in a plane and having,
        a neck portion extending from the main body portion,
        a head portion extending from the neck portion, the head portion forming a concave cable seat, the concave cable seat having a cable engaging surface,
    an end portion extending from the head portion,
    a cable retaining arm having,
        first and second parallel arms, each arm having a first end pivotally coupled to the hook portion adjacent the concave cable seat and opposite from the end portion, a second end and a mid portion, the mid portion having a cable engaging surface,
        a cross member having a first end and a second end, the first end of the cross member connected to the second end of the first parallel arm and the second end of the cross member connected to the second end of the second parallel arm, and
    means for releasably engaging the end portion of the hook portion, the releasably engaging means extending from the cross member, and a resilient member secured to one of the cable engaging surfaces,
    whereby the cable retaining arm is capable of closing upon a cable positioned in the cable seat and compressing the resilient member which acts like a spring to maintain a force on the cable.

17. The aerial cable spacer of claim 16, wherein the resilient member is secured to the cable engaging surface of the cable seat.

18. The aerial cable spacer of claim 17, wherein the cable engaging surface of the cable seat includes a recess and the resilient member is located in the recess.

19. The aerial cable spacer of claim 16, wherein the resilient member is secured to the cable engaging surface of the cable retaining arm.

20. The aerial cable spacer of claim 16, wherein another resilient member is secured to the cable engaging surface of the cable seat.

21. A device for supporting and spacing aerial cables, the device comprising:
    a main body portion, the main body portion having,
        a cable seat, the cable seat having a cable engaging surface,
        a first side adjacent the cable seat, and
        a second side adjacent the cable seat and opposite from the first side;
    a cable retaining arm having,
        a cable engaging surface,
        a first end pivotally coupled to the second side of the main body portion, and
        a second end, the second end having a means for releasably engaging the first side of the main body portion; and
    means for inducing a spring force in the retaining arm so that the retaining arm is easy to close yet provides a satisfactory force on the cable.

22. The device of claim 21, wherein the spring force inducing means is secured to the cable engaging surface of the cable seat.

23. The device of claim 22, wherein the cable engaging surface of the cable seat includes a recess and the spring force inducing means is located in the recess.

24. The device of claim 22, wherein the spring force inducing means is a resilient pad.

25. The device of claim 22, wherein the first side of the main body portion includes a plurality of teeth and the releasably engaging means includes a portion capable of releasably engaging the plurality of teeth, whereby the cable retaining arm is releasably locked in a position to retain the cable in the seat.

26. The device of claim 21, wherein the spring force inducing means is secured to the cable engaging surface of the cable retaining arm.

27. The device of claim 26, wherein the cable retaining arm includes a mid-portion, the mid-portion having an elbow portion, the elbow portion having the cable engaging surface, the spring force inducing means being secured to the cable engaging surface of the elbow portion.

28. The device of claim 26, wherein the spring force inducing means is a resilient pad.

29. The device of claim 26, wherein the first side of the main body portion includes a plurality of teeth and the releasably engaging means includes a portion capable of releasably engaging the plurality of teeth, whereby the cable retaining arm is releasably locked in a position to retain the cable in the seat.

30. The device of claim 26, wherein another spring force inducing means is secured to the cable engaging surface of the cable seat.

* * * * *